(12) United States Patent
Bouvet

(10) Patent No.: US 11,659,084 B2
(45) Date of Patent: May 23, 2023

(54) METHOD AND DEVICE FOR FILTERING A COMMUNICATION

(71) Applicant: ORANGE, Issy-les-Moulineaux (FR)

(72) Inventor: Bertrand Bouvet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 88 days.

(21) Appl. No.: 17/252,475

(22) PCT Filed: Jun. 14, 2019

(86) PCT No.: PCT/FR2019/051438
§ 371 (c)(1),
(2) Date: Dec. 15, 2020

(87) PCT Pub. No.: WO2019/243716
PCT Pub. Date: Dec. 26, 2019

(65) Prior Publication Data
US 2021/0274040 A1    Sep. 2, 2021

(30) Foreign Application Priority Data
Jun. 20, 2018 (FR) ...................................... 1855436

(51) Int. Cl.
*H04M 3/436* (2006.01)
*H04M 3/42* (2006.01)

(52) U.S. Cl.
CPC ....... *H04M 3/436* (2013.01); *H04M 3/42059* (2013.01); *H04M 3/42195* (2013.01); *H04M 2201/14* (2013.01)

(58) Field of Classification Search
CPC ............. H04M 3/436; H04M 3/42059; H04M 3/42195; H04M 2201/14
See application file for complete search history.

(56) References Cited

U.S. PATENT DOCUMENTS 8,379,816 B1 *  2/2013  Lu .......................... H04M 1/663
                                              379/142.04
9,332,119 B1 *  5/2016  Danis ................ H04M 3/42042
(Continued)

FOREIGN PATENT DOCUMENTS

FR    3037464 A1 * 12/2016  ............. H04L 51/12
FR    3037464 A1   12/2016

OTHER PUBLICATIONS

International Search Report dated Sep. 20, 2019 for corresponding International Application No. PCT/FR2019/051438, filed Jun. 14, 2019.
(Continued)

*Primary Examiner* — Minjung Kim
(74) *Attorney, Agent, or Firm* — David D. Brush; Westman, Champlin & Koehler, P.A.

(57) ABSTRACT

A method for filtering an original communication, being generated by a caller device toward a called device, and identified by an uncertified caller identity and by at least one certified caller identity. The method includes: verifying a condition satisfied if the uncertified caller identity and the at least one certified caller identity are different; and if the condition is satisfied, detecting expiry of a waiting duration following the verification, this duration being equivalent to the duration of at least one ring; and following the expiry and if no message is detected indicating the end of the original communication, presenting to the called device the original communication with at least one caller identity from among the uncertified caller identity and the at least one certified caller identity, the original communication not being presented to the called device before the detection.

20 Claims, 3 Drawing Sheets

(56) References Cited

U.S. PATENT DOCUMENTS

2005/0100008 A1* 5/2005 Miyata .............. H04M 3/42008
370/389
2007/0297599 A1* 12/2007 Sylvain ............. H04M 3/42042
379/373.01

OTHER PUBLICATIONS

Written Opinion of the International Searching Authority dated Sep. 20, 2019 for corresponding International Application No. PCT/FR2019/051438, filed Jun. 14, 2019.
French Search Report dated Feb. 20, 2019 for corresponding French Application No. 1855436, filed Jun. 20, 2018.
English translation of the Written Opinion of the International Searching Authority dated Oct. 1, 2019 for corresponding International Application No. PCT/FR2019/051438, filed Jun. 14, 2019.

* cited by examiner

METHOD AND DEVICE FOR FILTERING A COMMUNICATION

CROSS-REFERENCE TO RELATED APPLICATIONS

The present application is a Section 371 National Stage Application of International Application No. PCT/FR2019/051438, filed Jun. 14, 2019 and published as WO 2019/243716 A1 on Dec. 26, 2019, not in English, the contents of which are hereby incorporated by reference in their entireties.

BACKGROUND OF THE INVENTION

The invention relates to the general field of telecommunications. It more specifically concerns the field of filtering of unwanted (undesirable) calls.

Callees sometimes receive presentations of communications of short duration known as one-ring calls or ping calls. A ping call communication is of a duration short enough for a callee not to have the time to accept it and for the presentation of this communication not to be redirected to a voicemail of the call recipient. Such a ping call communication, free for the caller, is enough to display a caller number on the called terminal.

A communication of ping call type is considered as unwanted by the callee as it causes rings of short duration and clutters the callee's missed communications log.

If the communication of ping call type is redirected to a voicemail service of the callee, for example following an unconditional call forwarding or the callee being engaged, items of information are traced in the voicemail service even if the caller does not leave a message.

In addition, a ping call can be made by a malicious caller possessing a premium rate number and aiming for the called to call back.

In France, unwanted calls, including calls of ping call type, account for approximately 10% of incoming calls over the fixed-line network. Callees resort to unplugging their telephone from their fixed-line telephone installation to avoid further nuisance and others unsubscribe from the fixed-line telephone service.

A need exists for a solution for filtering unwanted incoming communications, in particular those of ping call type, to avoid these drawbacks.

Subject and Summary of the Invention

The invention concerns a method for filtering a communication, the so-called original communication, being generated by a caller device toward a called device, and identified by an uncertified caller identity and by at least one certified caller identity, the method comprising:
- a step of verifying a condition satisfied if the uncertified caller identity and the at least one certified caller identity are different; and if the condition is satisfied,
- a step of detecting the expiry of a waiting duration following the verification, the waiting duration being of a duration equivalent to at least one ring; and following the step of detecting the expiry and if no message is detected indicating the end of the original communication, a step of presenting to the called device the original communication with at least one caller identity from among the uncertified caller identity and said at least one certified caller identity, the original communication not being presented to the called device before the detection step.

Correspondingly, the invention concerns a device for filtering a communication, the so-called original communication being generated by a caller device toward a called device, and identified by an uncertified caller identity and by at least one certified caller identity. The device includes:
- a verification module configured to verify a condition satisfied if the uncertified caller identity and the at least one certified caller identity are different;
- a detection module configured to detect the expiry of a waiting duration following the verification if said condition is satisfied, the waiting duration being of a duration equivalent to at least one ring; and
- a communication presentation module configured to present to the called device the original communication with at least one caller identity from among the uncertified caller identity and said at least one certified caller identity, following the detection of the expiry of the waiting duration and if no message is detected indicating the end of the original communication, the original communication not being presented to the called device before said detection.

In a particular embodiment, the detection step and where applicable the presentation step are implemented if and only if the condition of the uncertified caller identity and the at least one certified caller identity being different is satisfied.

Within the meaning of the invention, a communication may be a phone call or a video-conferencing call or any other form of synchronous communication.

According to the invention, the waiting duration can be greater than or equal to 3 seconds, or greater than or equal to 5 seconds.

In general, the average duration of a ring is of 5 seconds and the forwarding of an unanswered call is configured as default after 5 rings.

In general, a ping call communication is of a duration greater than the duration of one ring (5 seconds), to display a trace of this communication on the called device, but which does not exceed the duration of a sequence of 4 rings (20 seconds), so that the communication is not forwarded.

According to the invention, the waiting duration does not exceed 20 seconds.

The waiting duration can be a time equivalent to at least one call return, or a predefined time corresponding to the average time it takes to accept a call, as observed on one or more called devices.

The waiting duration can correspond to an average time of presentation of communications cancelled on a network, for example a network of the called device, or a network comprising a filtering device in accordance with the invention and which implements the method of the invention. This waiting duration may be obtained from a database of the network.

In an embodiment, the waiting duration is determined by an exponential and limited counter, according to the following steps:
a) for any new certified caller identity, identifying an original communication within the meaning of the invention, the counter is initialized with an initial value, for example one second;
b) if the communication identified by this certified caller identity ends at or after this initial counter value and without it being answered by the called device, then the counter value is incremented, for example doubled with an increment of one second, otherwise the counter value remains unchanged; and c) step b is repeated every time a new communication identified by the same certified caller identity is received: if the new communication ends at or after the new counter value without being answered by the called device, the counter value is incremented again. Otherwise it remains unchanged.

The waiting duration is equivalent to the last value of the counter. According to this embodiment, the waiting duration is adaptive.

In an embodiment wherein the waiting duration is determined by the exponential and limited counter, the counter value does not exceed a maximum value equivalent to a duration at which this communication must be forwarded, for example 25 seconds. If the counter value reaches this maximum value, then it remains unchanged even if a new communication not answered by the called device ends at or after this counter value.

In an embodiment, the called device can be composed of several equipment items, such as a mobile phone, a tablet, and/or a smart watch. These items of equipment can share one and the same public identity, for example one and the same telephone number, or have different public identities contained in one and the same assembly entitled to receive a communication delivery service, for example a service of Service Fixed Line Supervision type. In accordance with the prior art, an incoming communication will be directed to the different equipment items of the called device simultaneously or sequentially if these items of equipment do not all have the same priority.

The uncertified caller identity can be inserted by the caller device.

The caller device can be a server, or an IPBX (Internet Protocol private Branch eXchange) or PABX (Private Automatic Branch eXchange) or a terminal possessing a specific application allowing it to insert the uncertified caller identity.

Within the meaning of the invention, a certified caller identity, also referred to as being "of certified type", is a Number of Designation of the Installation NDI.

Within the meaning of the invention, an uncertified caller identity, also referred to as being "of uncertified type", is a Number of Supplementary Designation SDN.

A description about certified NDI and uncertified NDS caller identities, in accordance with the prior art, is given below for a better understanding of the invention.

A certified caller identity NDI is certified by an entity managing the network of the caller device, for example the operator of the caller device.

In an embodiment wherein the communication is a phone call, this identity NDI can be corresponding to the phone number associated with the actual phone line of the caller device and is part of the international numbering plan E.164.

Several certified caller identities can identify one and the same communication. For example, in accordance with the SIP (Session Initiation Protocol, standard IETF RFC 3261), an outgoing call from a company can be identified by a PAI (Private Asserted Identity) field in a SIP URI format containing the number of the caller extension (in a "user" part as per the SIP URI format) and another PAI field in a TEL URI format corresponding to the standard phone number of the company, both PAI fields being included in a SIP INVITE call presentation message.

A SIP INVITE call presentation message can contain two PAI fields having two different formats, but containing one and the same item of information, for example one and the same phone number contained in a PAI field in the TEL URI format and in the user part of a PAI field in the SIP URI format.

In accordance with the prior art, an uncertified caller identity NDS is conveyed transparently from end to end from the caller device all the way to the called device without any monitoring either from a caller operator or from a transit operator, this uncertified caller identity NDS being inserted by the installation of the caller device.

In accordance with the SIP protocol, an uncertified caller identity NDS can be included in a SIP FROM field in a SIP INVITE message. According to the prior art, the SIP INVITE message contains only a single SIP FROM field.

An uncertified caller identity can be a masked (hidden) identity.

An uncertified caller identity can be an unavailable identity. For example, a call identified by an unavailable uncertified caller identity, in other words a call without uncertified caller identity, can be presented by a SIP INVITE message consisting of an empty SIP FROM field, for example a FROM field: "Unavailable" sip:unavailable@unknown.invalid. Typically when the signaling of the communication identified by this uncertified caller identity travels over a network not supporting the type of uncertified caller identity, for example an older-generation network, the uncertified caller identity is deleted.

In France, it is the uncertified caller identity NDS that is displayed on the called device. For example, when a call center issues communications to conduct a sales campaign at the request of a company, the call center does not present the number of the call center, but presents the number of the company as the uncertified caller identity NDS so that the called device can call back the company and not the call center.

In other countries, it is the certified caller identity NDI that is displayed on the called device.

The features and advantages of the filtering method according to the invention given below apply in the same way to the filtering device according to the invention, and vice versa.

The invention in particular makes it possible to minimize the drawbacks of an unwanted call of ping call type by avoiding such a communication being presented with at least one of its caller identities to the called device before the expiry of the waiting duration.

In an embodiment of the invention, no communication is presented to the called device before the detection of the expiry of the waiting duration. This embodiment has the advantage of not disturbing the callee if the communication is of ping call type, as he would not be notified of such a communication stopped before the expiry of the waiting duration, if this waiting duration has been chosen to be long enough.

In addition, the communications log of the called device will not be polluted by a trace of a communication of ping call type.

This embodiment avoids the called device calling the caller device back.

In this embodiment, the method includes, following the verification step, a step of sending to the caller device, before the detection of the expiry of the waiting duration, a message indicating that the called device has rung, without, however, making the called device ring.

In this way, the caller is not aware of the implementation of the method according to the invention and the quality of his experience will not be degraded.

Furthermore, generally it is the receipt of the ring indicator message by the caller device that allows it to set off a time counter to cancel the presentation of the communication in the case of a communication of ping call type. This embodiment is thus transparent vis-à-vis the ping call mechanism implemented by the caller device.

In another embodiment, the filtering method includes, following the verification step, the steps of:
- storing in the memory at least one caller identity from among the at least one certified caller identity and the uncertified caller identity; and
- presenting to the called device, before the detection of the expiry of the waiting duration, an anonymized temporary communication corresponding to the original communication but in which none of said certified and uncertified caller identities are presented, at least one of the caller identities stored in the memory being replaced by a masked caller identity of the same type, or presented as an unavailable identity (NDI-d, NDS-d) of the same type.

The term "anonymized communication" refers to a communication of which each of these caller identities is a masked (hided) or unavailable identity.

The invention thus makes it possible to alert the called device that the presented communication is liable to be an unwanted communication, for example of ping call type, the communication being presented in anonymous mode before the expiry of the waiting duration. The called device can therefore take the decision to only answer the communication upon the expiry of the waiting duration, if the original communication is still maintained.

In an embodiment wherein the uncertified caller identity of the communication is already masked or unavailable, this identity is presented to the called device before the detection of the expiry of the waiting duration without being replaced by a masked or unavailable uncertified caller identity.

The invention makes it possible to protect the called device from fraud attempts. Specifically, if the communication ends before the detection of the expiry of the waiting duration, the called device will not be able to call the caller device back, since only masked or unavailable identities have been presented to it.

In an embodiment relating to the presentation of the anonymized temporary communication before the expiry of the waiting duration, the step of presenting the original communication following the detection of the expiry of the waiting duration includes an updating of the anonymized temporary communication, replacing the at least one caller identity, which is masked or presented as unavailable, with the stored caller identity of the same type.

Thus, if the communication is maintained after the expiry of the waiting duration, the called device will be aware of the caller identity or identities of the original communication and which had been stored in the memory by the filtering device.

The updating of the communication can be based on a SIP UPDATE method (IETF RFC 3311 standard).

In another embodiment also relating to the presentation of the anonymized temporary communication before the expiry of the waiting duration, the step of presenting the communication following the expiry of the waiting duration comprises:
- cancelling the anonymized temporary communication; and
- a generating and presenting a new communication with at least one caller identity from among the stored caller identities.

In this mode, the new communication is presented immediately after the cancellation of the anonymized temporary communication, without any impact on any ringing of the called device.

This embodiment can be implemented by basic SIP protocol methods: sending a SIP CANCEL message indicating the end of the anonymized temporary communication then sending of a SIP INVITE message presenting the new communication.

In an embodiment, the filtering method includes a step of deleting a trace of the anonymized temporary communication from a communications log of the called device.

The step of deleting the trace of the temporary communication can be implemented:
- following the detection of the expiry of the waiting duration and if no message is detected indicating the end of the original communication, in this case the original communication is maintained upon or after the expiry of the waiting duration and the anonymized temporary communication is cancelled; or
- following the detection of the message indicating the end of the original communication, even if no expiry of the waiting duration has been detected.

The step of deleting the trace of the anonymized temporary communication can be implemented by sending to the called device a specific message including means for identifying the temporary communication and a command to delete its trace, for example a new SIP DELETE message containing the same SIP identities as those present in the SIP INVITE call presentation message in a way that allows the called device to make the link with the trace to be destroyed.

The SIP DELETE message is new with respect to the prior art concerning the SIP protocol.

In other words, on detecting the message indicating the end of the original communication and if the expiry of the waiting duration is not detected, the step of deleting the trace of the anonymized temporary communication can be implemented in the sub-steps of:
- inserting into the message indicating the end of the original communication an item of information used to signify to the called device that the anonymized temporary communication presented to the called device is classified as unwanted; and
- sending, to the called device, of the message indicating the end of the original communication.

The insertion of the item of information signifying to the called device that the original communication, and thus the anonymized temporary communication being presented to it, is classified as unwanted, can be based on a new reason code (the header used by the SIP protocol, IETF RFC 3326 standard) inserted into a SIP CANCEL message indicating the end of the original communication.

This method based on the insertion of the item of information is simpler than the method of sending a specific message, given that it reduces the number of messages exchanged, only the message indicating the end of the original communication (SIP CANCEL) being sent to the called device.

In addition, the header of the reason code of the SIP CANCEL message is already made use of (IETF RFC 3326 standard) by terminals to update their communication logs. For example in the case of an incoming call delivered to several terminals, all these terminals are notified of the incoming call but they have not all necessarily accepted it. The SIP CANCEL message indicating the end of this delivered call includes a "reason code=Call Completed Elsewhere" header indicating to each of these terminals that the trace of this call must be placed in a log of accepted incoming calls (even if the call has not been handled by the terminal) and not in a log of missed incoming calls.

The reason code indicating that the communication is classified as unwanted is new with respect to the prior art concerning the SIP protocol, in particular the IETF RFC 3326 standard.

In the same way, to delete the trace of an anonymized temporary communication cancelled following the expiry of the waiting duration, the step of deletion includes, following said cancellation of the anonymized temporary communication, the sub-steps of:

inserting into a message indicating the cancellation of the anonymized temporary communication an item of information used to signify to the called device that a trace of this anonymized temporary communication should be deleted; and:

sending, to the called device, the message indicating the cancellation of the anonymized temporary communication.

In an embodiment, on detecting the message indicating the end of the original communication before the detection of the expiry of the waiting duration, the original communication is considered unwanted.

In an embodiment, the filtering method includes, if the original communication is considered unwanted, a step of recording at least one caller identity from among the certified caller identities NDI and the uncertified caller identity NDS from a list of caller identities generating unwanted communications, if the identity in question is not already recorded in the list.

The invention then makes it possible to build and update a list relating to the reputation of caller identities to optimize the method according to the invention.

In an embodiment, if the original communication is considered unwanted, the filtering method includes the updating of the waiting duration as a function of a duration of the original unwanted communication, the duration of the unwanted communication being the duration separating a detection of a presence of this original communication by the filtering device and the detection of the message indicating the end of the original communication.

In particular if the duration of the unwanted original communication is shorter than the waiting duration, then the waiting duration takes as a new value the duration of the unwanted original communication. Thus, the waiting duration is adaptive and communications of shorter duration can be filtered.

In an embodiment, the verification step also includes the verification of a condition satisfied if the original communication must not be forwarded, for example because of an unconditional forwarding, an engaged line, or an unavailability of the called device since in such a case, there is no risk of the original communication being presented to the called device.

In an embodiment, the verification step also includes the verification of a condition satisfied if at least one of the caller identities, certified or uncertified, has been recorded in the list of caller identities generating unwanted communications, since in such a case, the original communication is liable to be an unwanted communication.

In an embodiment, the verification step also includes the verification of a condition satisfied if the original communication has transited via an international-national interconnection and if the uncertified caller identity comprises a national fixed-line prefix.

The national fixed-line prefix can be a geographical national fixed-line prefix, for example 01, 02, 03, 04 or 05 in France, or a non-geographical national fixed-line prefix, for example 09 in France.

In an embodiment, the detection module, included in the filtering device, includes a countdown timer configured to obtain and/or monitor the waiting duration.

In an embodiment, the filtering device further includes a ringing module configured to send the caller device a message indicating that the called device has rung without, however, the called device ringing.

In an embodiment, the filtering device includes a recording module configured to store in a memory at least one caller identity from among the at least one certified caller identity NDI and the uncertified caller identity NDS. The communication presentation module being further configured to present to the called device, before the detection of the expiry of the waiting duration, an anonymized temporary communication corresponding to the original communication but in which none of the certified and uncertified caller identities are presented, at least one of the caller identities stored in the memory being replaced by a masked caller identity of the same type, or presented as an unavailable identity of the same type.

In an embodiment, the filtering device further includes a reputation module configured to record a list of caller identities generating unwanted communications. In an embodiment, the filtering device is implemented in a network device from among:

a network server managing the called device;
an item of network termination equipment;
a messaging server associated with the called device;
an item of network interconnection equipment;
a telephone switch;
a platform of SCP service control point type; or
a network server managing the caller device.

The implementation of the filtering device in an item of network equipment advantageously makes it possible, when a communication of ping call type is detected, to limit the signaling toward the called device and to save network resources (and in particular the resources of the access network used to route the original communication to the called device, which can prove critical, particularly in the case of radio access.)

This embodiment further makes it possible to avoid monopolizing resources at the called device for the original communication during the waiting duration (in other words, as long as a communication of one-ring call type is suspected). The called device remains available during this waiting duration and can take part in other communications.

In an embodiment, the filtering device is implemented in the called device.

Hence, several items of equipment of the network, including the called device and even the caller device, can implement the method of the invention.

The invention also concerns a computer program on a recording medium, this program being able to be implemented in a computer or in a device for filtering a communication in accordance with the invention, this program including instructions suitable for implementing a method for filtering a communication as described above.

This program can use any programming language, and be in the form of source code, object code, or intermediate code between source code and object code, such as in a partially compiled form, or in any other desirable form.

The invention also concerns information or recording media readable by a computer and including instructions of the computer program as mentioned above.

The information or recording media can be any entity or device capable of storing programs. For example, the media can include a storage means, such as a ROM, for example a CD-ROM or a microelectronic circuit ROM, or else a magnetic recording medium, for example a diskette (floppy disk) or a hard disk, or a Flash memory.

Moreover, the information or recording media can be transmissible media such as an electrical or optical signal, that can be routed via an electrical or optical cable, by radio link, by wireless optical link or by other means.

The program according to the invention can in particular be downloaded over a network of Internet type.

Alternatively, each information or recording medium can be an integrated circuit into which the program is incorporated, the circuit being suitable for executing or for being used in the execution of the method for filtering a communication according to the invention.

BRIEF DESCRIPTION OF THE DRAWINGS

Other features and advantages of the present invention will become apparent from the description below, with reference to the appended drawings which illustrate an exemplary embodiment thereof devoid of any limitation. In the figures.

DETAILED DESCRIPTION

Figure 1:
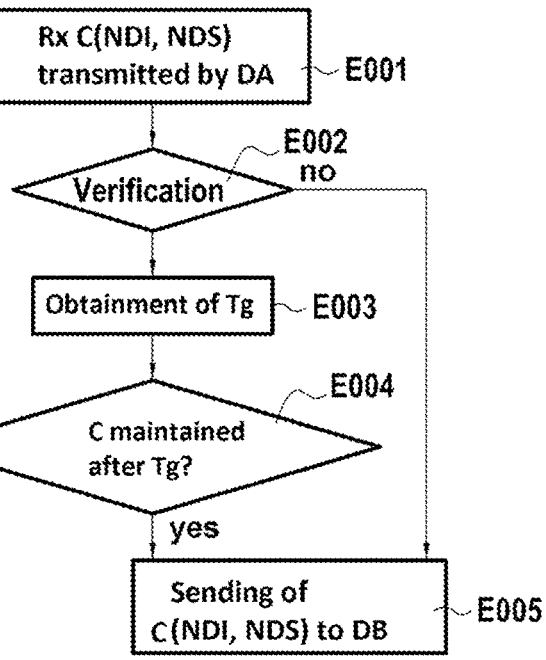
FIG. 1 is a block diagram showing the general steps of a filtering method in accordance with the invention.

FIG. 1 is a block diagram showing the general steps of a method for filtering an original communication, the method being in accordance with the invention.

The method is implemented by a filtering device in accordance with the invention. This filtering device is included in a network consisting of at least one caller device DA and one called device DB.

During a step E001, the filtering device receives an original communication C transmitted by the caller device DA and intended for the called device DB. The original communication is identified by at least one certified caller identity NDI and by an uncertified caller identity NDS.

During a step E002, the filtering device verifies a condition satisfied if the uncertified caller identity NDS is different from the certified caller identity NDI, if there is a single identity NDI, or from all the certified caller identities NDI if there are several identities NDI.

If this condition is not satisfied, the filtering device presents this original communication to the called device DB during a step E005 in accordance with the prior art.

Otherwise, the filtering device estimates that the original communication C may represent un unwanted original communication, for example of ping call type.

In this case, during a step E003, the filtering device obtains a waiting duration Tg during which it does not present the original communication C with its certified NDI and uncertified NDS caller identities to the called device DB.

During a step E004, the filtering device detects the expiry of the waiting duration Tg.

If no message is detected indicating the end of the original communication C on the expiry of the waiting duration Tg, the filtering device presents to the called device DB the original communication C with its certified NDI and uncertified NDS caller identities during a step E005.

Two particular embodiments will now be described in detail.

Detailed Description of a First Embodiment

Figure 2:
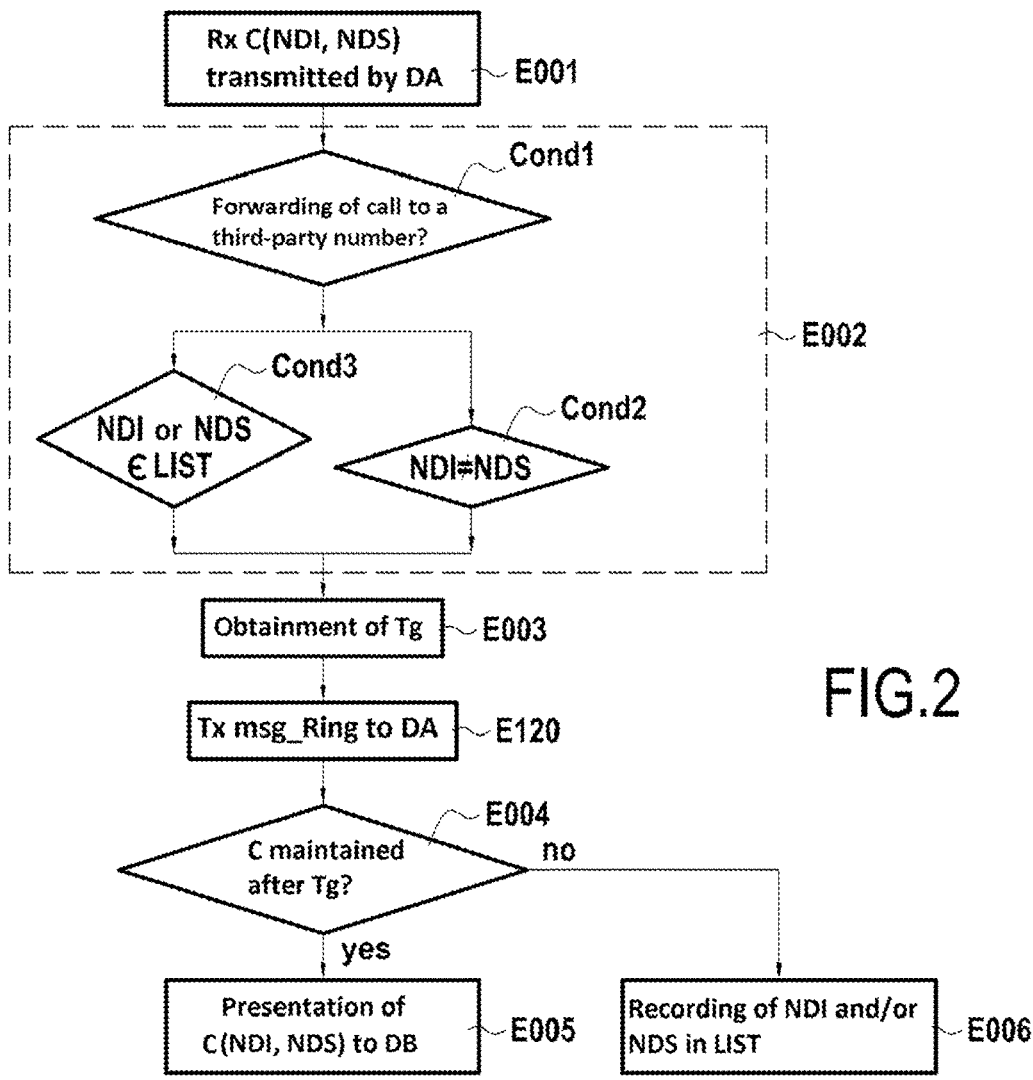
FIG. 2 is a block diagram showing the steps of a filtering method in accordance with a first embodiment of the invention.

FIG. 2 is a block diagram showing the steps of a method for filtering an original communication, in accordance with a first embodiment of the invention.

In this embodiment, the original communication is a phone call C. The caller DA and called DB devices communicate according to the SIP protocol.

In this embodiment, the method of the invention is implemented, with reference to the steps E001, E002, E003, E120, E004, E005 and E006 described below, by a network server D1 managing the called device DB, for example a switch of the called device DB in STN (Switched Telephone Network) fixed-line or 2G or 3G mobile circuit technology or else an application server.

During a step E001, the network server D1 receives the original call C intended for the called device DB.

The original call C is identified by a certified caller identity NDI and an uncertified caller identity NDS. In this embodiment, the caller device DA is a device capable of inserting the uncertified caller identity into the original call C.

The certified caller identity NDI is certified by an entity managing the network of the caller device DA, for example the operator of the caller device DA. This identity NDI, transported by the network all the way to the network server D1, corresponds to the telephone number associated with the actual phone line of the caller device DA.

The certified caller identity NDI is transmitted to a PAI field in a SIP INVITE call presentation message.

The uncertified caller identity NDS is transported in a transparent manner from end to end from the caller device DA all the way to the server D1 without any control from the caller operator, this uncertified caller identity NDS being inserted by the telephone installation of the caller device DA.

The uncertified caller identity NDS is transmitted in a SIP FROM field in the SIP INVITE call presentation message.

During a step E002, the server D1 verifies certain conditions allowing it to estimate whether or not the original call C is unwanted.

In this example, the server D1 verifies a condition Cond1 satisfied if the original call C must not be redirected to a different number of a voicemail service associated with the called device DB, for example because the called device DB is engaged or because of an unconditional call forwarding, or else because of unavailability of the called device DB. If the original call C must be redirected to a number different from that of the voicemail service, the server D1 processes the original call in accordance with a method of the prior art as the original call will not, in the end, be presented to the called device DB.

Otherwise (Cond1 is satisfied) the server D1 continues to implement other steps of the method of the invention.

In this example, the condition Cond1 is satisfied.

The server D1 also verifies the following conditions:
a condition Cond2 satisfied if the certified NDI and uncertified NDS caller identities are different; and
a condition Cond3 satisfied if at least one caller identity among the caller identities NDI and NDS has been recorded in a list LIST of caller identities generating unwanted calls; the list LIST being managed by the server D1.

If at least one of these conditions Cond2 or Cond3 is satisfied, the server D1 estimates that the original call C is liable to be a call of ping call type and thus continues to implement the method of the invention. Otherwise, the server D1 handles the original call C in accordance with a method of the prior art.

In this example, all the conditions Cond1, Cond2 and Cond3 are satisfied.

During a step E003, the server D1 obtains a waiting duration Tg. In this example, this waiting duration Tg is sufficient to filter ping calls of a duration equivalent to the duration of one ring on the called device DB. The waiting duration Tg has a value of 7 seconds.

The server D1 can obtain the waiting duration Tg from the called device DB or from its own memory or from another item of network equipment.

During a step E120, the server D1 sends the caller device DA a message msg_Ring simulating that the called device DB is notified of the original call C, for example a SIP 180 Ringing ring message.

Thus, when the caller device DA receives the message msg_Ring, it can trigger a counter of a maximum time of presentation of the original call C transmitted to the called device DB, so that this original call C is of short duration (of ping call type).

During a step E004, the server D1 detects the expiry of the waiting duration Tg and verifies if the original call C is still maintained by the caller device DA. To do this, the server D1 verifies if it has received, before the expiry of the waiting duration Tg, a SIP CANCEL message ending the original call C.

In a first case where the original call C is not maintained on the expiry of the waiting duration Tg, the server D1 records during a step E006 at least one identity from among NDI and NDS in the list LIST if it is not already recorded.

In a second case where the original call is still maintained on the expiry of the waiting duration Tg, during a step E005, the server D1 presents the original call C to the caller device DB, with its certified NDI and uncertified NDS caller identities. With respect to the call presentation methods of the prior art, the call set-up time is lengthened by the value of the waiting duration Tg. This lengthening will be undergone by the caller device DA but will have no impact on the experience of the called device DB.

Figure 3:
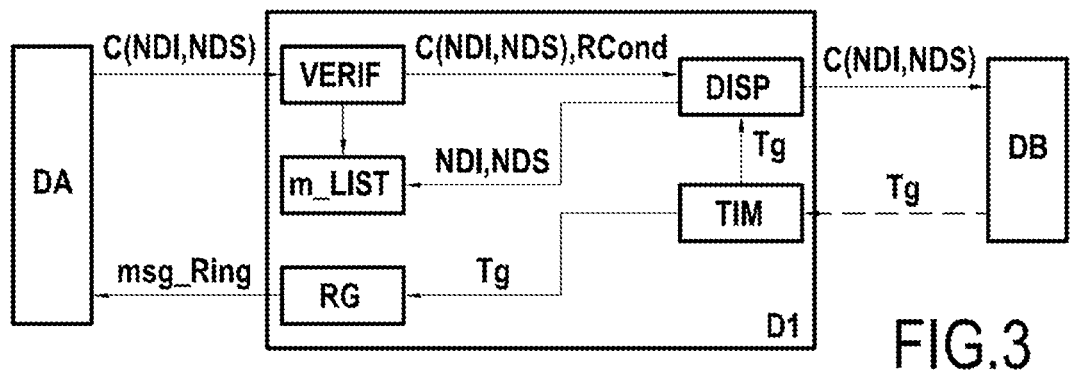
FIG. 3 illustrates the functional architecture of a filtering device according to the first embodiment.

FIG. 3 presents a functional architecture of a device D1 for filtering a communication C, in accordance with the first embodiment of the invention, as well as its interactions with the caller DA and called DB devices.

In this example, the filtering device is the network server D1 managing the called device DB.

The filtering device D1 includes:
a verification module VERIF configured to verify at least one of the conditions Cond1, Cond2 and Cond3 described with reference to FIG. 2,
a communication presentation module DISP configured to present the original call C with at least one of the certified NDI and uncertified NDS caller identities to the called device DB if no message is detected indicating the end of the original call C and following the expiry of the waiting duration Tg after the verification of the conditions Cond1, Cond2 and Cond3;
a ringing module RG configured to send the caller device DA the message msg_Ring indicating the ringing of the called device DB;
a reputation module m_LIST configured to record the list LIST of caller identities generating unwanted calls; and
a countdown timer TIM configured to obtain the waiting duration Tg and to monitor the waiting.

The filtering device D1, and more precisely its verification module VERIF, receives, from the caller device DA, the original call C with its caller identities NDI and NDS. In particular, to verify the condition Cond3, the module VERIF consults the reputation module m_LIST. At the end of the verifications, the verification module VERIF sends the results RCond of these verifications to the communication presentation module DISP and presents the original call C to it.

The dummy ringing module RG sends the message msg_Ring to the caller device DA, as long as the original call C is maintained by the caller device DA, without, however, the called device DB ringing before the expiry of the waiting duration Tg.

The communication presentation module DISP obtains the waiting duration Tg from the countdown timer TIM and does not present the original call C with its caller identities NDI and NDS to the called device DB until the expiry of the waiting duration Tg if the original call C is still maintained by the caller device DA.

If the original call C is not maintained on the expiry of the waiting duration Tg, the communication presentation module DISP sends at least one from among the caller identities NDI and NDS to the reputation module m_LIST for the updating of the list LIST.

The countdown timer TIM can obtain the waiting duration Tg from the called device DB.

Detailed Description of a Second Embodiment

Figure 4:
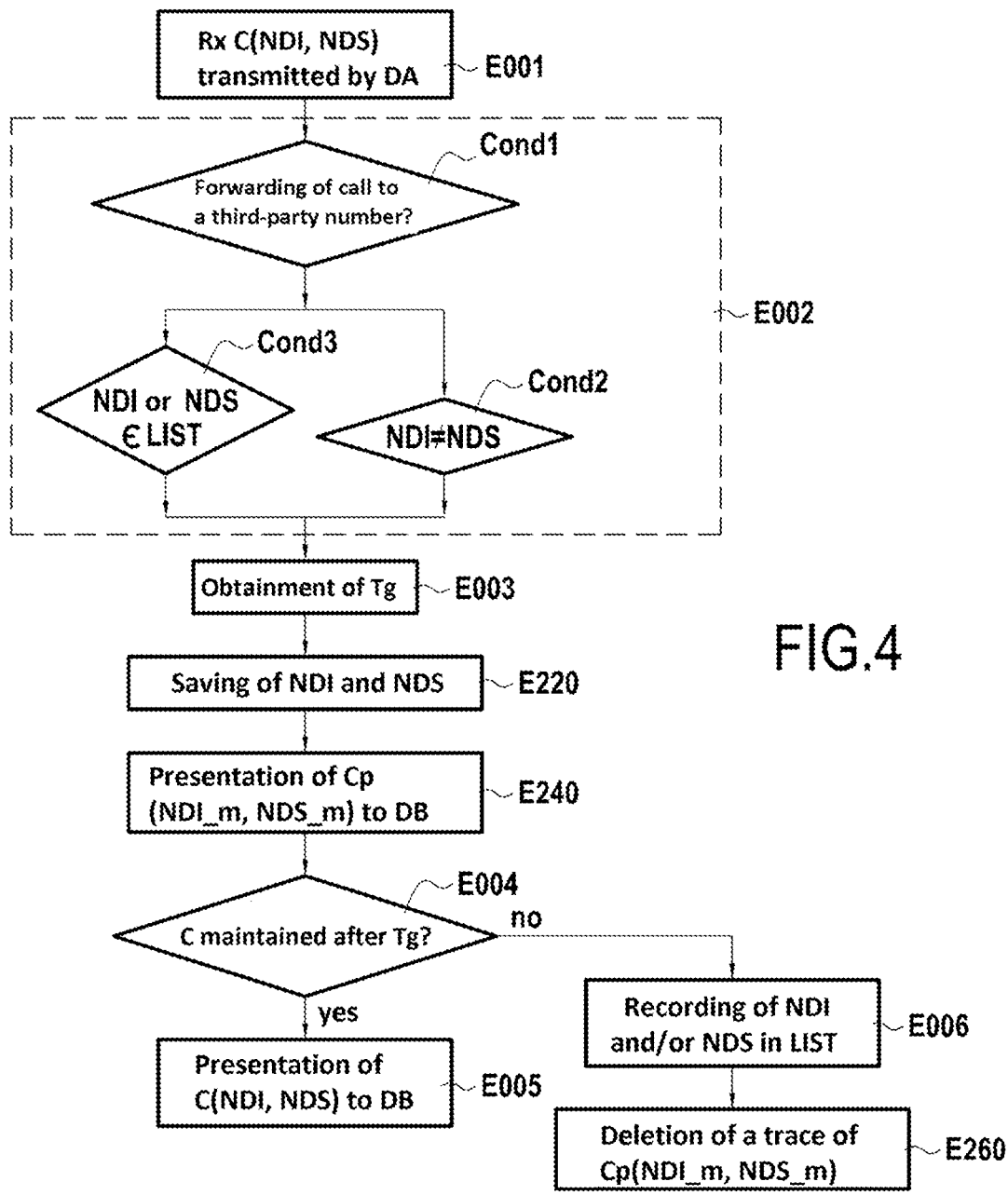
FIG. 4 is a block diagram showing the steps of a filtering method in accordance with a second embodiment of the invention.

FIG. 4 is a block diagram showing the steps of a method for filtering an original communication, in accordance with a second embodiment of the invention.

In this embodiment, the original communication C is a phone call transmitted by a caller device DA and intended for a called device DB. The caller DA and called DB devices communicate according to the SIP protocol.

In this embodiment, the method of the invention is implemented, with reference to the steps E001, E002, E003, E220, E240, E004, E005, E006 and E260 described below, by a network server D2 managing the called device DB, for example a switch of the network of the called device DB in STN fixed-line or mobile 2G or 3G circuit technology or by an application server.

During a step E001, the server D2 receives the original call C intended for the called device DB.

The original call C is identified by a certified caller identity NDI and an uncertified caller identity NDS. The certified NDI and uncertified NDS caller identities are respectively transmitted in a SIP PAI field and in a SIP FROM field in a SIP INVITE call presentation message.

During a step E002 similar to step E002 described with reference to FIG. 2, the server D2 verifies certain conditions allowing it to estimate whether or not the original call C is an unwanted call.

In this example, the server D2 verifies the conditions Cond1, Cond2 and Cond3 described with reference to FIG. 2.

During a step E003 similar to step E003 described with reference to FIG. 2, the server D2 obtains a waiting duration Tg.

During a step E220, the server D2 records in a memory the caller identities NDI and NDS.

During a step E240, the server D2 presents an anonymized temporary communication Cp to the called device DB. This call Cp corresponds to the original call C but adding to the SIP INVITE call presentation message an SIP Privacy field equal to "id, header" used to specify that the certified caller identity NDI included in the SIP PAI field must not be presented on the called device DB, and replacing, in the SIP FROM field, the uncertified caller identity NDS with a masked uncertified caller identity NDS_m, for example a SIP FROM field: "Anonymous" sip: anonymous@anonymous. invalid.

The presentation time of the anonymized temporary communication Cp is at the most equal to the waiting duration Tg.

The called device DB then receives the call Cp in anonymous mode. Hence, it will know that this call Cp is liable to be an unwanted call. We suppose in this example that the called device DB does not answer the call Cp.

During a step E004 similar to the step E004 described with reference to FIG. 2, the server D2 detects the expiry of the waiting duration Tg and verifies if the original call C is still maintained by the caller device DA.

In a first case where the original call C is not maintained on the expiry of the waiting duration Tg, during a step E006 similar to the step E006 described with reference to FIG. 2, the server D2 records at least one identity from among NDI and NDS in the list LIST if it is not already recorded.

During a step E260, the server D2 sends a command to the called device DB to delete the trace of the anonymized temporary communication Cp from the communications log of the called device DB, so that this log is not polluted. This step E260 is optional but it is preferred.

In this embodiment, the server D2 sends during the step E260, a SIP DELETE message repeating all the information contained in the SIP INVITE message used to present the anonymized temporary communication Cp to the called device DB during the step E240 in such a way that the called device DB makes the link with the call Cp to be erased. These items of information contain SIP dialogue technical identifiers, for example of Call-Id, From-Tag and/or To-Tag type. In a further step, the server D2 will receive from the called device DB a SIP 200 OK acknowledgement message.

The SIP DELETE message is new with respect to the state of the art concerning the SIP protocol.

In a second case where the original call C is still maintained, during a step E005, the server D2 restores the caller identities NDI and NDS stored in the memory and presents to the caller device DB a call corresponding to the original call C with its caller identities NDI and NDS.

We will now describe two variants relating to the step E005 of this second embodiment.

In the first variant, the server D2 updates the anonymized temporary communication Cp presented to the called device DB during the step E240, replacing the masked identities NDI_m and NDS_m with the saved identities NDI and NDS respectively. To do this, the server D2 sends a SIP UPDATE message (RFC 3311 standard) to the called device DB. Thus, a single trace of the updated call, corresponding to the original call C with at least one of its identities NDI and NDS, appears on the communications log of the called device DB.

In this first variant, the called device DB supports the SIP UPDATE message. In the second variant, illustrated by FIG. 5, the server D2 cancels, during a step E250, the anonymized temporary communication Cp(NDI_m, NDS_m) presented to the called device DB during step E240, generates a new call Cn(NDI, NDS) with the saved caller identities NDI and NDS and presents this new call Cn(NDI, NDS) to the called device DB during a step E270. The new call Cn(NDI, NDS), identical to the original call C, presents a restoration thereof.

This second variant has the advantage of operating in a sure way on the called device DB since it uses the basic SIP INVITE and SIP CANCEL methods. Two call traces are generated on the communications log of the called device DB corresponding to the anonymized temporary communication Cp(NDI_m, NDS_m) and to the new call Cn(NDI, NDS). The server D2 can implement a step E290 similar to the step E260 to delete the trace of the anonymized temporary communication Cp (NDI_m, NDS_m) presented during the step E240.

Figure 6:
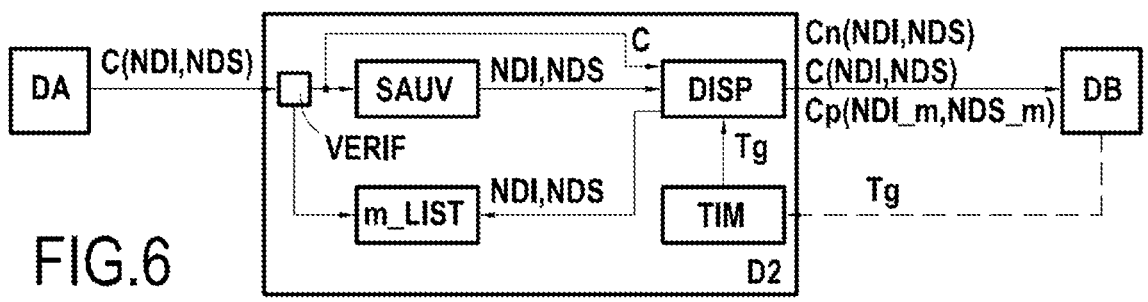
FIG. 6 illustrates the functional architecture of a filtering device according to the second embodiment.

FIG. 6 shows a functional architecture of a device D2 for filtering an original communication C, in accordance with the second embodiment of the invention, as well as its interactions with the caller DA and called DB devices.

In this example, the filtering device is the network server D2 managing the called device DB.

The filtering device D2 includes:
- a verification module VERIF, similar to the module VERIF described with reference to FIG. 3;
- a communication presentation module DISP configured to present to the called device DB:
  - the anonymized temporary communication Cp with masked caller identities NDI_m and NDS_m as a replacement for the certified NDI and uncertified NDS caller identities before the expiry of the waiting duration Tg, and
  - the new communication Cn with at least one of the certified NDI and uncertified NDS caller identities if the original communication C is still maintained by the caller device DA on the expiry of the waiting duration;
- a reputation module m_LIST similar to the module m_LIST described with reference to FIG. 3;
- a countdown timer TIM similar to the counter TIM described with reference to FIG. 3; and
- a recording module SAUV configured to store in the memory the certified NDI and uncertified NDS caller identities.

If the call C is not maintained by the caller device DA on the expiry of the waiting duration Tg, the communication presentation module DISP obtains at least the saved caller identities NDI and NDS from the recording module SAUV and sends it to the reputation module m_LIST for the updating of the list LIST.

Other Embodiments

In an embodiment, the caller DA and called DB devices communicate according to a fixed-line circuit protocol, for example the ISUP (ISDN User Part Signaling) protocol for a Switched Telephone Network STN or an Integrated Services Digital Network ISDN, or according to a mobile circuit protocol, for example the BICC (Bearer-Independent Call Control) protocol for a $2^{nd}$ or $3^{rd}$ generation mobile network. In this embodiment, the certified caller identity NDI is a signaling field "Calling Party Number", whereas the uncertified caller identity NDS is a signaling field "Generic Number" or "Additional Calling Party Number".

In an embodiment, the called device DB includes several terminals.

In an embodiment, the waiting duration Tg is configured to filter ping calls of a maximum duration corresponding to a duration of two rings on the called device DB. This waiting duration is for example of 12 seconds.

In an embodiment, the verification step E002 also includes the verification of a condition satisfied if the original communication C has transited over an international-national interconnection and if the uncertified caller identity NDS comprises a national fixed-line prefix.

To verify if the original communication C has transited over an international-national interconnection, it is possible to test a value of a location information field containing, for example, a unique dedicated code indicating the international origin of the communication, this value being inserted by an item of interconnection equipment managed by a national operator. In France for example, the code 99 is inserted for incoming communications to the national territory.

In an embodiment wherein the original communication C must be redirected to a voice message of the called device DB, the server D1 or D2 presents the original communication C to the voicemail services during the step E005 (steps E240 or E005 respectively).

In an embodiment, the anonymized temporary communication Cp, presented by the server D2 to the called device DB during the step E240, is a communication without any caller identity. The server D2 deletes the SIP PAI field so that the certified caller identity NDI is presented as an unavailable identity NDI_d, and in the SIP FROM field replaces the uncertified caller identity NDS by an unavailable uncertified caller identity NDS_d, for example a SIP FROM field: "Unavailable" sip:unavailable@unknown.invalid).

In an embodiment, the anonymized temporary communication Cp is identified solely by a single masked or unavailable caller identity NDI_m or NDS_m.

In an embodiment, the anonymized temporary communication Cp is identified by a masked caller identity of a first type and an unavailable caller identity of a second type, for example a masked certified caller identity NDI_m and an unavailable uncertified caller identity NDS_d.

In an embodiment wherein the original communication C must be redirected to a voicemail service of the called device DB, the server D2 sends a command to delete a trace of the anonymized temporary communication Cp from the voicemail service during the step E260 or the step E290.

In an embodiment, the reputation list LIST is managed by a network device other than the device that implements the method of the invention.

In an embodiment inherited from the second embodiment described with reference to FIG. 4, if the uncertified caller identity NDS of the original communication C is already masked or unavailable, this identity is presented to the called device DB before the expiry of the waiting duration Tg, without being replaced by another masked or unavailable identity of the same type.

In an embodiment inherited from the second embodiment described with reference to FIG. 4, following the sending of the SIP DELETE message to the called device DB during the step E260 or the step E290 to delete the trace of the temporary call Cp, the server D2 receives from the called device DB an error code, for example:
 a 404 Not Found code if the trace of the call Cp does not exist, for example if the called has already himself deleted the trace of this call Cp; or
 a 405 Method Not allowed code if the called device DB does not support the SIP DELETE message.

In an embodiment inherited from the second embodiment described with reference to FIG. 4, the server D2 sends to the called device DB the SIP DELETE message in order to delete the trace of the anonymized temporary communication Cp before relaying to the called device DB the SIP CANCEL message indicating the end of the original call C.

In an embodiment inherited from the second embodiment described with reference to FIG. 4, the step E260 of deleting the trace of the anonymized temporary communication Cp precedes the step E006 of recording at least one of the caller identities NDI and NDS in the reputation list LIST.

In an embodiment inherited from the second embodiment described with reference to FIG. 4, the step E260 of deleting the trace of the anonymized temporary communication Cp even precedes the step E004 of detecting the expiry of the waiting duration Tg. The step E260 is implemented after the step E240 of presenting the anonymized temporary communication Cp, and on detection of a message C_end indicating the end of the original communication C.

Figure 7:
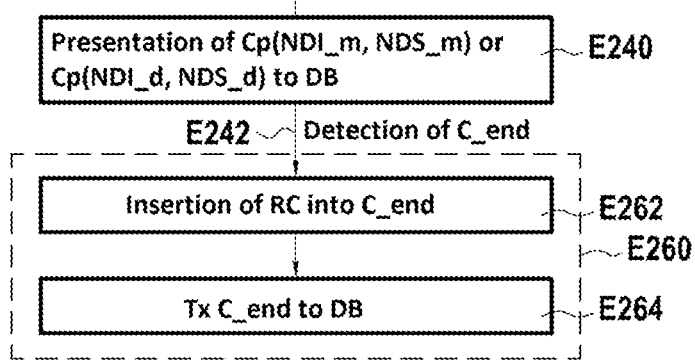
FIG. 7 is a block diagram showing the steps of a filtering method, in accordance with an embodiment inherited from the second embodiment.

FIG. 7 is a block diagram representing the steps of a method for filtering an original communication, in accordance with an embodiment inherited from the second embodiment described with reference to FIG. 4. The filtering device D2 detects a message C_end, of SIP CANCEL type, indicating the end of the original call C. The expiry of the waiting duration Tg is not yet detected. To delete (E260) the trace of the anonymized temporary communication Cp presented to the called device DB during the step E240, the filtering device D2 inserts, during a step E262, in a reason code SIP header (IETF RFC 3326 standard) of the SIP CANCEL message, a new code RC indicating that the original call C, and thus the anonymized temporary communication Cp presented to the called device DB, is an unwanted call of one-ring call type. The reason code SIP header of the SIP CANCEL message can for example contain a new code "Ping_Call". This new code is to be added to the IETF RFC 3326 standard. Next, during a step E264, the filtering device D2 sends the message C_end to the called device DB. On receiving this message, the called device DB ends the presentation of the anonymized temporary communication Cp and becomes aware that this call Cp is of one-ring call type. It can then decide to delete its trace from its communications log.

Figure 5:
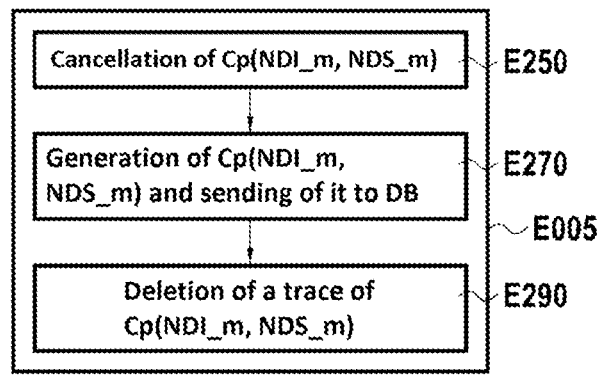
FIG. 5 is a block diagram showing the steps of a filtering method in accordance with a variant of the second embodiment of the invention.

In an embodiment inherited from the second embodiment described with reference to FIGS. 4 and 5, to delete (E290) the trace of the anonymized temporary communication Cp canceled during the step E250, the deletion step E290 includes, following the cancellation of the anonymized temporary communication Cp, the sub-steps of:
 inserting into a SIP CANCEL message indicating the cancellation of the call Cp an item of information used to signify to the called device DB that a trace of this call Cp should be deleted, for example a new code in the reason code SIP header; and sending to the called device DB the SIP CANCEL message indicating the cancellation of the anonymized temporary communication Cp.

In an embodiment, following the detection of a message indicating the end of the original communication C, for example a SIP CANCEL message, before the expiry of the waiting duration Tg, the filtering device D1, D2 records (E006) at least an NDI or NDS identity from the list LIST, without waiting for the detection (E004) of the expiry of the waiting duration Tg.

Description of a Device for Filtering a Communication in Accordance with the Invention Two examples of functional architecture of the filtering device D1, D2, have already been described with reference to FIGS. 3 and 6.

Figure 8:
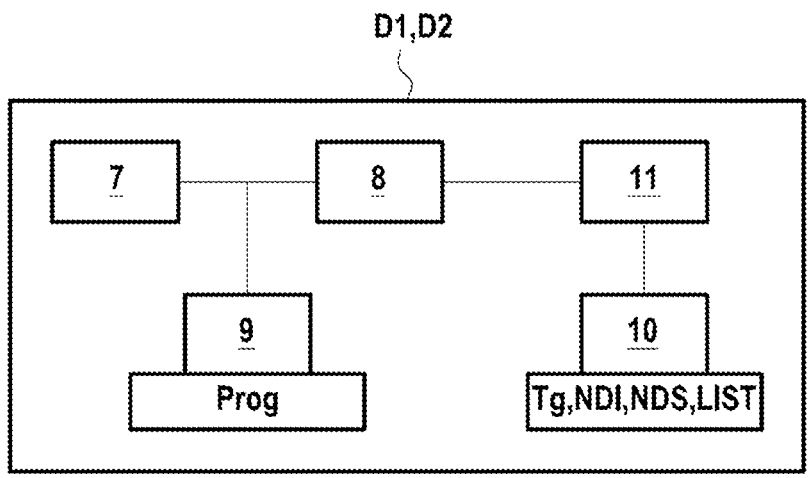
FIG. 8 illustrates the hardware architecture of a filtering device according to an embodiment of the invention.

In the embodiments described here, the filtering device D1, D2 in accordance with the invention has the architecture of a computer, as illustrated in FIG. 8. It comprises in particular a processor 7, a random access memory 8, a read-only memory 9, a non-volatile flash memory 10 in a particular embodiment of the invention, as well as communicating means 11. Such means are known per se and are not described in more detail here.

The read-only memory 9 of the filtering device D1, D2 according to the invention constitutes a recording medium in accordance with the invention, readable by the processor 7 and on which is recorded, here, a computer program Prog in accordance with the invention.

The memory 10 of the filtering device D1, D2 is used to record variables used for executing the steps of the invention, such as the value of the countdown timer TIM, the waiting duration Tg, the caller identities NDI and NDS and the reputation list LIST.

The computer program Prog defines functional and software modules here, configured to filter an original communication C. These functional modules rely on on and/or control the hardware elements 7-11 of the filtering device D1, D2 mentioned previously.

The device for filtering an original communication C, in accordance with the invention, can be implemented in an item of network equipment such as for example:
- a network server managing the called device, such as the servers D1 and D2 described previously;
- an item of network termination equipment;
- a messaging server associated with the called device DB;
- an item of network interconnection equipment;
- a telephone switch;
- a platform of SCP service control point type; or
- a network server managing the caller device DA.

In a variant, the filtering device can be implemented in the called device DB.

The invention claimed is:

1. A method for filtering an original communication generated by a caller device toward a called device, and identified by an uncertified caller identity and by at least one certified caller identity, said method comprising:
in response to said uncertified caller identity and said at least one certified caller identity being different:
at an expiry of a duration of at least one ring, in response to detecting that no message has been received indicating an end of said original communication, presenting to said called device said original communication with at least one caller identity from among said uncertified caller identity and said at least one certified caller identity, said original communication not being presented to the called device before said expiry; and
presenting to said called device, before said expiry, an anonymized temporary communication corresponding to said original communication but in which none of said certified and uncertified caller identities are presented, at least one of said caller identities being replaced by a masked caller identity of a same type, or presented as an unavailable identity of the same type.

2. The filtering method as claimed in claim 1 wherein said method includes, sending to said caller device a message indicating that said called device has rung without the called device ringing.

3. The filtering method as claimed in claim 1 wherein presenting said original communication includes an updating of said anonymized temporary communication, by replacing said at least one caller identity which is masked or presented as unavailable with said caller identity of the same type.

4. The filtering method as claimed in claim 1 wherein presenting said original communication comprises:
cancelling the anonymized temporary communication; and
generating and presenting a new communication with at least one of said stored caller identities.

5. The filtering method as claimed in claim 1 including deleting a trace of the anonymized temporary communication from a communications log of said called device.

6. The filtering method as claimed in claim 5 wherein said deleting includes, on detecting a message indicating an end of said original communication and in response to no expiry being detected:
inserting into said message indicating the end of the original communication, an item of information used to signify to the called device that said anonymized temporary communication presented to said called device is classified as an unwanted communication; and
sending, to said called device, of said message indicating the end of the original communication.

7. The filtering method as claimed in claim 1 wherein, on detecting a message indicating an end of said original communication before said expiry, classifying said original communication as unwanted.

8. The filtering method as claimed in claim 7 including recording, in response to said original communication being classified as unwanted, at least one caller identity from among said at least one certified caller identity and said uncertified caller identity in a list of caller identities generating unwanted communications, if this recording has not already been carried out.

9. The filtering method claimed in claim 1 comprising a verification of at least one of the following conditions:
a condition satisfied if said original communication must not be forwarded;
a condition satisfied if at least one of said caller identities has been recorded in said list of caller identities generating unwanted communications; and
a condition satisfied if the original communication has transited via an international-national interconnection and if the uncertified caller identity comprises a national fixed-line prefix.

10. A filtering device for filtering an original communication generated by a caller device toward a called device, and identified by an uncertified caller identity and by at least one certified caller identity, said device comprising:
a processor; and a non-transitory computer-readable medium comprising instructions stored thereon which when executed by the processor configure the filtering device to:

in response to said uncertified caller identity and said at least one certified caller identify being different:
- at an expiry of a duration of at least one ring, in response to detecting that no message has been received indicating an end of said original communication, present to said called device said original communication with at least one caller identity from among said uncertified caller identity and said at least one certified caller identify, said original communication not being presented to the called device before said expiry; and
- present to said called device, before said expiry, an anonymized temporary communication corresponding to said original communication but in which none of said certified and uncertified caller identities are presented, at least one of said caller identities being replaced by a masked caller identity of the same type, or presented as an unavailable identity of the same type.

11. The filtering device as claimed in claim 10, wherein the filtering device is further configured to send said caller device a message indicating that said called device has rung without the called device ringing.

12. The filtering device as claimed in claim 10, wherein the filtering device is further configured to record a list of caller identities generating unwanted communications.

13. The filtering device as claimed in claim 10, being implemented in a device from among:
- a network server managing said called device;
- an item of network termination equipment;
- a messaging server associated with said called device;
- an item of network interconnection equipment;
- a telephone switch;
- a platform of SCP service control point type; or
- a network server managing said caller device.

14. A non-transitory computer-readable data medium having stored thereon instructions which, when executed by a processor of a filtering device, cause the processor to perform the method of claim 1.

15. The filtering method as claimed in claim 4 including deleting a trace of the anonymized temporary communication from a communications log of said called device.

16. A method for filtering an original communication generated by a caller device toward a called device, and identified by an uncertified caller identity and by at least one certified caller identity, said method comprising:

in response to said uncertified caller identity and said at least one certified caller identity being different:
- at an expiry of a duration of at least one ring, in response to detecting that no message has been received indicating an end of said original communication, presenting to said called device said original communication with at least one caller identity from among said uncertified caller identity and said at least one certified caller identity, said original communication not being presented to the called device before said expiry,
- in response to detecting a message indicating an end of said original communication before said expiry, updating said duration of at least one ring as a function of a duration of said original communication.

17. The filtering method as claimed in claim 16 wherein, on detecting a message indicating an end of said original communication before said expiry, classifying said original communication as unwanted.

18. The filtering method as claimed in claim 17 including recording, in response to said original communication being classified as unwanted, at least one caller identity from among said at least one certified caller identity and said uncertified caller identity from a list of caller identities generating unwanted communications, if this recording has not already been carried out.

19. The filtering method claimed in claim 16 comprising a verification of at least one of the following conditions:
- a condition satisfied if said original communication must not be forwarded;
- a condition satisfied if at least one of said caller identities has been recorded in said list of caller identities generating unwanted communications; and
- a condition satisfied if the original communication has transited via an international-national interconnection and if the uncertified caller identity comprises a national fixed-line prefix.

20. A non-transitory computer-readable data medium having stored thereon instructions which, when executed by a processor of a filtering device, cause the processor to perform the method of claim 16.

* * * * *